Patented Oct. 21, 1947

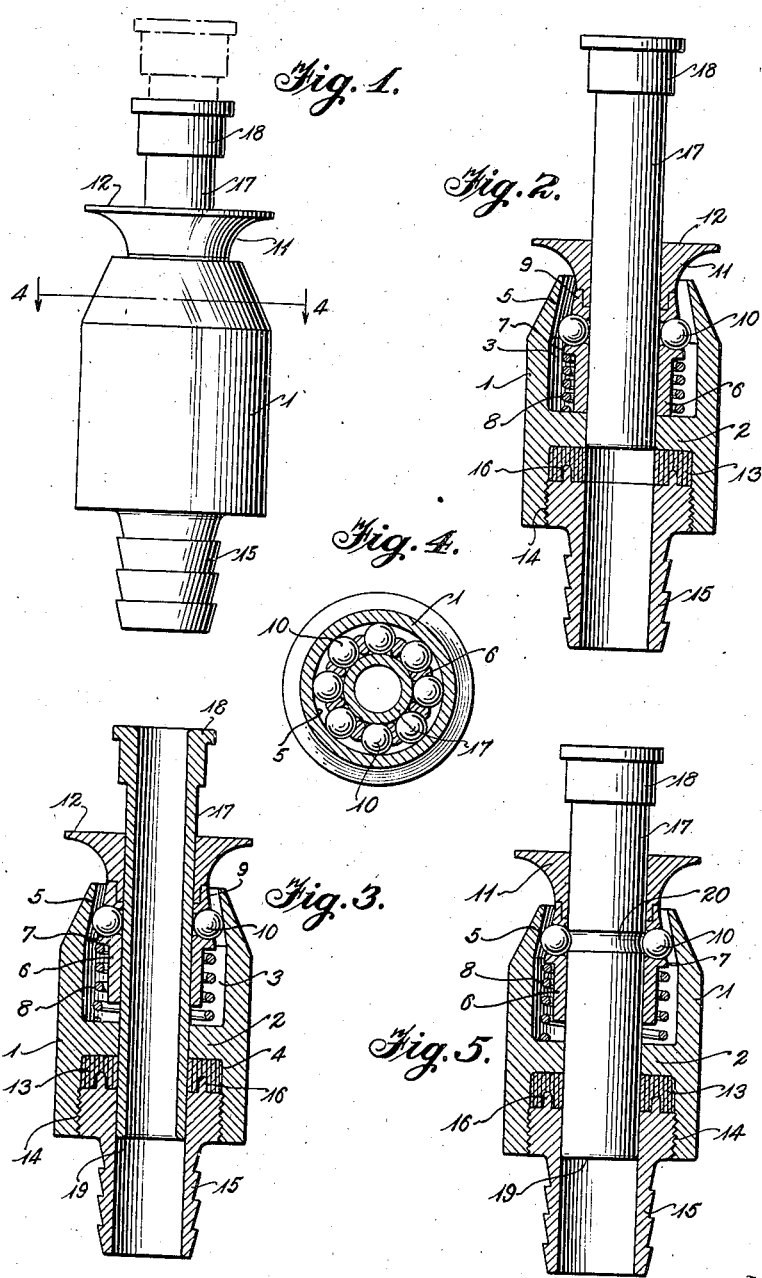

2,429,202

UNITED STATES PATENT OFFICE 2,429,202

FLUID COUPLING

Edwin V. Estill and William Leslie Earle, Baltimore, Md., assignors to B-R Engineering Company, Baltimore, Md.

Application February 5, 1943, Serial No. 474,866

7 Claims. (Cl. 285—169)

The primary object of our invention is to provide a coupling for fluid pipes, conduits or the like, that is entirely automatic in the coupling operation.

Another object of our invention is to provide a self-locking fluid coupling of the plug and socket type that does not require any preliminary setting of the locking means but which is always set for automatic locking when the plug is inserted in the socket.

A further object of our invention is to provide a fluid coupling of the plug and socket type wherein the stationary socket is provided with a movable spring urged ball clutch for the plug releasable under insertion pressure of the plug and automatically engaging the same when the plug is in inserted position.

Still another object of our invention is to provide an automatic fluid coupling of the character shown with manual clutch releasing means to permit withdrawal of the plug from the socket.

A still further object of our invention is to provide a fluid seal in the socket member of the coupling with which the inserted plug cooperates to ensure a leakproof coupling when the parts are assembled.

Other and further objects of the invention will be apparent from a detailed description thereof, wherein only a preferred form of embodiment of the invention is shown and described reference being had to the accompanying drawings, forming a part hereof, in which:

Figure 1 is a side elevation of the coupling showing the plug inserted in the socket in full lines and the entering position of the plug in dotted lines.

Figure 2 is a vertical section through the socket showing the plug in elevation, in entering position.

Figure 3 is a vertical section through the plug and socket in locked relation.

Figure 4 is a horizontal section on the line 4—4 of Figure 1.

Figure 5 is a vertical section through the socket with the plug in elevation of a modified form of our invention.

The coupling comprises a socket or female member 1 formed of an annular casing having aligned openings and a cross partition 2 centrally apertured in alignment with said openings. The partition separates the interior of the socket member 1 into an upper recess 3 and a lower recess 4. The upper portion of the socket surrounding the upper opening is tapered to form an inner inwardly tapered face 5 for a purpose to be hereinafter described.

Within the upper recess 3 is arranged a longitudinally movable sleeve 6, shouldered intermediate its ends on its outer surface as indicated at 7. Between the shoulder 7 and bottom of the recess 3 is interposed a coiled spring 8. The exterior of the sleeve 6 above the shoulder 7 is tapered as shown at 9 substantially complementary with the inner tapered face 5 of the socket casing. Arranged circumferentially around the portion 9 are a series of clutch elements or balls 10 which are so mounted that a slight lateral movement is permitted to project a portion of the circumference of each ball either beyond the plane of the tapered face 9, or the annular inner wall of the sleeve 6, according to the direction of movement.

The outer end of the sleeve 6 is provided with a circular extension 11 projecting from the socket with an inner bore corresponding to that of the sleeve and flared outwardly to terminate in a flat top 12 of approximately the diameter of the socket 1.

The lower recess 4 of the socket receives a U-shaped washer 13 arranged therein with the U facing outwardly and its inner wall in substantial alignment with the wall of the opening in the partition 2. The lower inner face of the recess 4 is threaded at 14 and receives therein the threaded upper portion of a nipple 15 whose bore also corresponds with the inner surface of the opening in the partition 2. To the lower portion of the nipple 15 projecting beyond the socket 1, is adapted to be connected a hose or the like (not shown). The front face of the nipple has formed thereon an annular rib 16 adapted to enter the U of the washer 13 to compress and hold the same in the bottom of the recess 4 when the nipple is screwed into position.

A plug or male member 17 is provided for the coupling which comprises an annular rigid tube enlarged at its upper end 18 to be connected with a hose or the like (not shown). The exterior insertable portion of the plug is smooth as shown in Figures 1 to 4, inclusive, and has a snug sliding fit through the extension and sleeve in the upper recess 3 of the socket, the opening in the cross partition 2 and the inner bore of the nipple 15. The plug 17 is of sufficient length to be inserted the full length of the socket with its lower end 19 normally resting in a plane common with the lower edge of the socket 1, as clearly shown in the drawing. In Figure 5, the plug 17 is shown with an annular exterior groove 20 as a modification.

Normally when the parts of the coupling are disassembled the spring 8 in the socket 1 forces the sleeve 6 outwardly and the balls 10 engaging the tapered face 5 have portions forced laterally beyond the interior face of the sleeve. When a plug 17 having a smooth outer face as shown in Figures 1 to 4 inclusive, is inserted, generally manually, in the socket it will engage the projected portions of the balls and move the sleeve 6 longitudinally against the tension of the spring 8. When movement of the sleeve disengages the balls 10 from contact with the tapered face 5 the balls can shift laterally and the plug slip past to continue its insertion under pressure the full length of the socket. When insertion pressure ceases the spring 8 moves the sleeve longitudinally in the opposite direction until the balls 10 again contact the tapered face 5, whereupon they are urged inwardly against the plug 17 to frictionally and automatically clutch or grip the same to prevent withdrawal. Due to the fact this structure provides in effect a spring clutch, the locking of the plug in the socket is entirely automatic and it may be inserted and locked with one hand.

In the modified form of our invention shown in Figure 5, the operation is identical with that previously described except the plug 17 is provided with an exterior groove 20 in which the balls 10 seat in locked position. This provides a more positive lock than the frictional contact which may be desirable in some instances where this type of coupling is used.

When assembled the coupling may be easily released from locked position by depressing the flared extension 11 of the sleeve 6 which projects above the socket 1. Depression of the extension 11 moves the sleeve longitudinally against the spring 6 and the clutch balls 10 away from contact with the tapered or inclined face 5 whereupon the gripping engagement either against the smooth face of the plug, or in the groove 20 is released, and the plug may be easily withdrawn.

Another important feature of our coupling is the complete sealing of the same against any leakage of pressure or vacuum. The inserted plug cooperates to insure this seal. The U-shaped washer 13 is normally compressed by the inserted nipple 15. As the plug is inserted entirely through the socket it is apparent a portion thereof will engage the inner wall of the washer and exert a lateral pressure which when combined with the end pressure of the nipple, will make a very effective seal against the possibility of leakage. The rib 16 on the nipple end fitting into the U of the washer 13 firmly holds the same in place when the plug is not in the socket.

The automatic engagement of our coupling is of considerable utility in many uses to which a fluid coupling is applied as it permits the coupling to be made with one hand and eliminates the necessity of releasing the locking means manually before the plug can be inserted in the socket. The flat top 12 of the releasing extension 11 affords an easy means for release as two fingers of either hand may straddle the plug and by depression in line with the coupling the clutch or grip is released so the plug can be easily withdrawn from the socket.

From the foregoing description, it is believed that the operation of the apparatus as a whole will be clear to those skilled in the art. The apparatus described should not be construed as limiting the invention however beyond the scope of the appended claims.

We claim:

1. A coupling of the character described including a socket and plug insertable therein, a longitudinally movable clutch carried by the socket engaged by and releasable upon movement of the plug to inserted position and automatically operable to frictionally lock the plug in the socket after insertion, and a rigid bearing surface provided by said socket internally of said clutch for embracing said plug in its inserted position.

2. A coupling of the character described including a socket and plug insertable therein, an intermediate flange in said socket, a longitudinally movable clutch carried by the socket, a spring interposed between said flange and said clutch, said clutch being engaged by and releasable upon movement of the plug to inserted position and operated by said spring for reverse movement to lock the plug in the socket, and means exterior of the socket to manually move the clutch against spring tension to permit withdrawal of the plug.

3. A coupling of the character described including a socket and plug insertable therein, an internal integral flange in said socket, a longitudinally movable ball clutch in said socket frictionally engaged by the plug upon insertion therein, a yieldable spring interposed between said flange and clutch to normally urge the clutch to operative position, and a stationary tapered surface in said socket against which the balls of the clutch are forced to lockingly engage the plug after the force of insertion of the same in the socket has ceased.

4. A coupling of the character described including a socket and plug insertable therein, a longitudinally movable ball clutch in said socket frictionally engaged by the plug upon insertion therein, a yieldable spring seated upon a fixed portion of said socket to normally urge the clutch to operative position, a stationary tapered surface in said socket against which the balls of the clutch are forced to engage the inserted plug, and an annular groove in said plug to receive the balls.

5. A coupling of the character described including a socket and plug insertable therein, and a longitudinally movable spring urged ball clutch in said socket yieldably engaged by the plug upon movement therein and automatically gripping the same when movement of insertion ceases, said clutch comprising a sleeve having an intermediate shoulder serving as a bearing surface for the spring.

6. A fluid coupling socket including a casing having aligned openings and an integral shoulder defining an interior recess adjacent one end, an annular sleeve longitudinally movable in said recess, a spring in said recess seated upon said shoulder to urge the sleeve in one direction, a plurality of clutch balls carried by said sleeve movable in and out of operative position, a tapered face on the interior of the casing against which the balls are forced by spring movement of the sleeve to urge them laterally to clutch position, and said sleeve extending through the opening adjacent the recess and being outwardly flared.

7. A coupling of the character described including a recessed socket having aligned openings therein, a cross partition in said socket having a central aperture aligned with the openings, clutch means in the upper recess, a plug insertable in the socket through the upper recess and engaged by the clutch, a nipple adjustably engaged with said socket through the other opening, a sealing washer in the lower recess interposed between said partition and said nipple, and said plug extending through the socket to engage the sealing washer in the lower recess.

EDWIN V. ESTILL.
W. LESLIE EARLE.

REFERENCES CITED

The following references are of record in the file of this patent:

UNITED STATES PATENTS

| Number | Name | Date |
| --- | --- | --- |
| 1,337,288 | Stichler | Apr. 20, 1920 |
| 1,573,862 | Raber | Feb. 23, 1926 |
| 1,848,538 | Mudd | Mar. 8, 1932 |
| 2,127,284 | Board | Aug. 16, 1938 |